United States Patent
Minemura et al.

(10) Patent No.: US 10,507,828 B2
(45) Date of Patent: Dec. 17, 2019

(54) METHOD AND APPARATUS FOR CONTROLLING ACTIVATION TIMING FOR SAFETY DEVICE

(71) Applicants: DENSO CORPORATION, Kariya, Aichi pref. (JP); TOYOTA JIDOSHA KABUSHIKI KAISHA, Toyota-shi, Aichi-ken (JP)

(72) Inventors: Akitoshi Minemura, Kariya (JP); Yosuke Ito, Kariya (JP); Wataru Ike, Toyota (JP); Kazuki Nemoto, Susono (JP)

(73) Assignees: DENSO CORPORATION, Kariya, Aichi-pref. (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 152 days.

(21) Appl. No.: 15/562,372

(22) PCT Filed: Mar. 31, 2016

(86) PCT No.: PCT/JP2016/060793
§ 371 (c)(1),
(2) Date: Sep. 27, 2017

(87) PCT Pub. No.: WO2016/159297
PCT Pub. Date: Oct. 6, 2016

(65) Prior Publication Data
US 2018/0118205 A1    May 3, 2018

(30) Foreign Application Priority Data

Mar. 31, 2015    (JP) ................................ 2015-072919

(51) Int. Cl.
*B60W 30/09*    (2012.01)
*B60T 7/12*    (2006.01)
(Continued)

(52) U.S. Cl.
CPC ......... *B60W 30/09* (2013.01); *B60R 21/0134* (2013.01); *B60T 7/12* (2013.01);
(Continued)

(58) Field of Classification Search
CPC ...................................................... B60W 30/09
See application file for complete search history.

(56) References Cited

U.S. PATENT DOCUMENTS 6,832,157 B2 * 12/2004 Egami ................ B62D 15/0265
340/435
7,894,959 B2 *  2/2011 Bernzen ................ B60R 21/013
180/232
(Continued)

FOREIGN PATENT DOCUMENTS

DE    10 2004 056 118    5/2006
DE    10 2006 051 787    5/2008
(Continued)

*Primary Examiner* — Hussein Elchanti
*Assistant Examiner* — Michael A Berns
(74) *Attorney, Agent, or Firm* — Knobbe, Martens, Olson & Bear, LLP

(57) ABSTRACT

A setting unit of a safety-device activation timing controlling apparatus sets a first timing upon it being determined that a driver's collision avoidance operation in a longitudinal direction has been carried out. The first timing is later than a reference timing for activating the safety device. The setting unit sets a second timing upon it being determined that a driver's collision avoidance operation in the lateral direction has been carried out. The second timing is later than the reference timing. Upon it being determined that at least one of the driver's collision avoidance operation in the longitudinal direction of the own vehicle and the driver's collision avoidance operation in the lateral direction of the own vehicle has been carried out, an activation determining unit determines whether to activate the safety device in (Continued)

accordance with a corresponding at least one of the first timing and the second timing.

25 Claims, 9 Drawing Sheets

(51) Int. Cl.
*B60R 21/0134* (2006.01)
*B60W 10/18* (2012.01)
*B60W 10/30* (2006.01)
*B60W 30/095* (2012.01)
*B60W 50/08* (2012.01)
*B60W 50/14* (2012.01)
*B60T 7/22* (2006.01)
*G01S 13/86* (2006.01)
*G08G 1/16* (2006.01)
*G01S 13/93* (2006.01)

(52) U.S. Cl.
CPC .............. *B60T 7/22* (2013.01); *B60W 10/18* (2013.01); *B60W 10/30* (2013.01); *B60W 30/0953* (2013.01); *B60W 50/087* (2013.01); *B60W 50/14* (2013.01); *G01S 13/867* (2013.01); *G01S 13/931* (2013.01); *G08G 1/166* (2013.01); *B60T 2201/022* (2013.01); *B60W 2540/10* (2013.01); *B60W 2540/12* (2013.01); *B60W 2550/143* (2013.01); *G01S 2013/9342* (2013.01); *G01S 2013/9346* (2013.01)

(56) References Cited

U.S. PATENT DOCUMENTS

| 9,418,302 | B2* | 8/2016 | Minemura ............ G06K 9/6217 |
| 9,650,040 | B2* | 5/2017 | Minemura ........ B60W 30/0953 |
| 2009/0012684 | A1 | 1/2009 | Thiele |
| 2010/0036565 | A1 | 2/2010 | Bernzen et al. |
| 2014/0343749 | A1 | 11/2014 | Minemura et al. |
| 2015/0063648 | A1 | 3/2015 | Minemura et al. |

FOREIGN PATENT DOCUMENTS

| JP | 2007168697 A | 7/2007 |
| JP | 2007249539 A | 9/2007 |
| JP | 2011-195083 | 10/2011 |
| JP | 2012-011862 | 1/2012 |
| JP | 2012008718 A | 1/2012 |
| JP | 2012103969 A | 5/2012 |
| JP | 2013-237361 | 11/2013 |
| JP | 2014222463 A | 11/2014 |
| JP | 2015045622 A | 3/2015 |
| JP | 2016-175572 | 10/2016 |

* cited by examiner

METHOD AND APPARATUS FOR CONTROLLING ACTIVATION TIMING FOR SAFETY DEVICE

TECHNICAL FIELD

The present invention relates to methods and apparatuses for controlling an activation timing for a safety device provided in an own vehicle in accordance with a collision probability between the own vehicle and an object located in a travelling direction of the own vehicle.

BACKGROUND ART

Conventionally, pre-crash safety (PCS) systems are known; these PCS systems mitigate and/or avoid collision damages between an own vehicle and objects, i.e. obstacles, such as other vehicles, pedestrians, or road structures located in the travelling direction of the own vehicle. Such a PCS system obtains a time to collision (TTC) with an object based on a relative distance of the obstacle with respect to the own vehicle and a relative speed or a relative acceleration of the obstacle relative to the own vehicle. The TTC represents a margin time until which the own vehicle would collide with the obstacle. Then, the PCS system causes a warning device to provide, to the driver of the own vehicle, a warning about the approach of the obstacle, and/or activates a braking device of the own vehicle.

As an example of such a PCS system, a cruise-assist system is disclosed in patent document 1. The cruise-assist system disclosed in patent document 1 sets a risk level indicative of a risk of collision between an own vehicle and an object, and provides, to a driver, drive-assist information based on the risk level.

CITATION LIST

Patent Literature

Japanese Patent Application. Publication No. 2012-103969

SUMMARY

Technical Problem

The conventional PCS system may activate a safety device although a driver shows intention to avoid a collision, resulting in experiencing the feeling of troublesome activation of the safety device.

For solving such a problem, the present invention mainly seeks to provide methods and apparatuses for activating a safety device, each of which is capable of setting a proper activation timing in accordance with a driver's intention.

Solution to Problem

A safety-device activation timing controlling apparatus according to a first aspect of the present invention controls, based on a probability of a collision between an own object and a target object existing in a travelling direction of the own vehicle, an activation tinning for a safety device for avoiding the collision or mitigating damage from the collision. The apparatus includes a first determining unit that determines whether a driver's collision avoidance operation in a longitudinal direction of the own vehicle has been carried out upon the target object existing in the travelling direction of the own vehicle. The apparatus includes a second determining unit that determines whether a driver's collision avoidance operation in a lateral direction of the own vehicle has been carried out upon the target object existing in the travelling direction of the own vehicle.

The apparatus includes a setting unit that sets a first timing upon it being determined that a driver's collision avoidance operation in the longitudinal direction of the own vehicle has been carried out. The first timing is later than a reference timing for activating the safety device. The setting unit sets a second timing upon it being determined that a driver's collision avoidance operation in the lateral direction of the own vehicle has been carried out. The second timing is later than the reference timing. The apparatus includes an activation determining unit that, upon it being determined that at least one of the driver's collision avoidance operation in the longitudinal direction of the own vehicle and the driver's collision avoidance operation in the lateral direction of the own vehicle has been carried out, determines whether to activate the safety device in accordance with a corresponding at least one of the first timing and the second timing.

A safety-device activation timing controlling method according to a second aspect of the present invention controls, based on a probability of a collision between an own object and a target object existing in a travelling direction of the own vehicle, an activation timing for a safety device for avoiding the collision or mitigating damage from the collision. The method includes a first determining step that determines whether a driver's collision avoidance operation in a longitudinal direction of the own vehicle has been carried out upon the target object existing in the travelling direction of the own vehicle. The method includes a second determining step that determines whether a driver's collision avoidance operation in a lateral direction of the own vehicle has been carried out upon the target object existing in the travelling direction of the own vehicle. The method includes a setting step that sets a first timing upon it being determined that a driver's collision avoidance operation in the longitudinal direction of the own vehicle has been carried out. The first timing is later than a reference timing for activating the safety device. The setting step sets a second timing upon it being determined that a driver's collision avoidance operation in the lateral direction of the own vehicle has been carried out. The second timing is later than the reference timing. The method includes an activation determining step that, upon it being determined that at least one of the driver's collision avoidance operation in the longitudinal direction of the own vehicle and the driver's collision avoidance operation in the lateral direction of the own vehicle has been carried out, determines whether to activate the safety device in accordance with a corresponding at least one of the first timing and the second timing.

Upon it being determined that the collision avoidance operation in the longitudinal direction of the own vehicle has been carried out based on a driver's accelerator-pedal operation or a driver's brake-pedal operation or the collision avoidance operation in the lateral direction of the own vehicle has been carried out based on a driver's steering operation, the above configuration activates the safety device at a timing later than the reference tuning. This configuration enables activation of the safety device being delayed in accordance with the driver's collision avoidance operation between the own vehicle and the target object.

The driver can perform both the collision avoidance operation in the longitudinal direction of the own vehicle based on a driver's accelerator-pedal operation or a driver's brake-pedal operation, and the collision avoidance operation in the lateral direction of the own vehicle based on a driver's steering operation. The driver also can perform either a collision avoidance operation in the longitudinal direction of the own vehicle or a collision avoidance operation in the lateral direction of the own vehicle.

That is, the accelerator-pedal operation or the brake-pedal operation can cause the relative distance of the target object relative to the own vehicle in the travelling direction to increase, or the relative speed of the target object relative to the own vehicle to decrease. This enables a collision between the own vehicle and the target object to be avoided. Similarly, the steering operation can cause the lateral position of the target object to be deviated from the travelling direction of the own vehicle. This also enables a collision between the own vehicle and the target object to be avoided.

DESCRIPTION OF THE EMBODIMENTS

Figure 1:
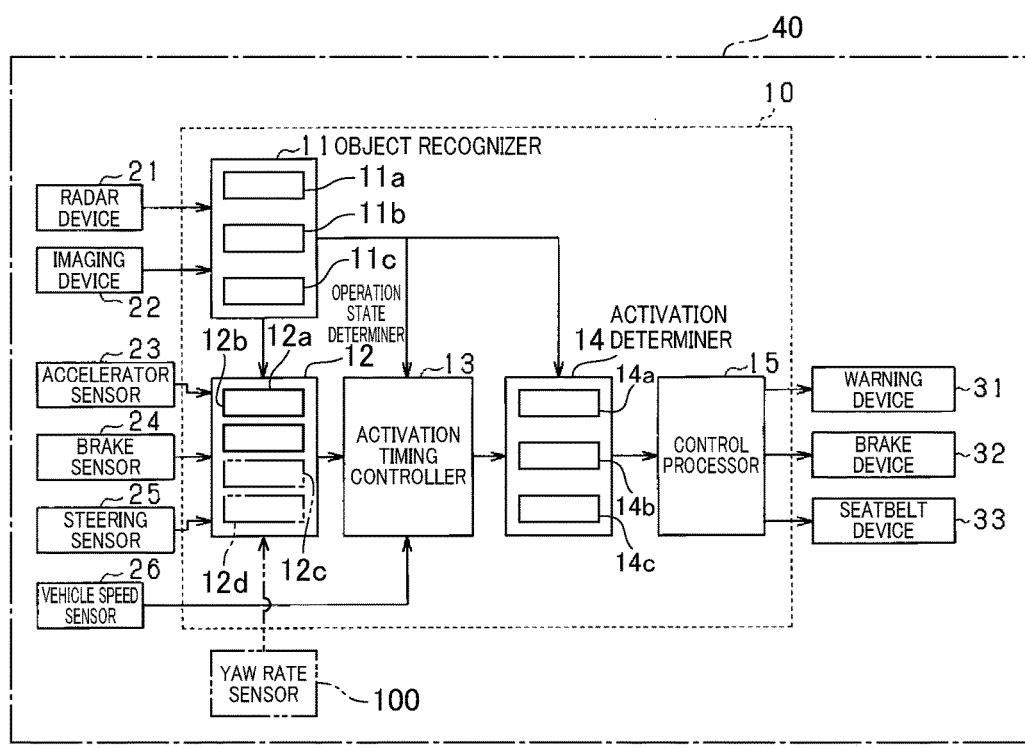
FIG. 1 is a structural diagram of a cruise-assist apparatus according to the first embodiment of the present invention.

The following describes embodiments of the present disclosure with reference to the accompanying drawings. In the embodiments, like parts between the embodiments, to which like reference characters are assigned, are omitted or simplified to avoid redundant description.

First Embodiment

A cruise-assist apparatus according to the first embodiment is installed in an own vehicle 40. The cruise-assist apparatus serves as a PCS system that 1. Determines whether an object is located around the own vehicle 40, such as in the travelling direction of the own vehicle 10, i.e. in the forward direction of the own vehicle 40

2. Performs control to avoid collision between the object and the own vehicle 40 and/or mitigate damage due to collision therebetween upon determination that the object is located around the own vehicle 10

Referring to FIG. 1, a cruise-assist ECU 10, which serves as a cruise-assist apparatus, includes a computer that is comprised of a CPU, a memory including a ROM and a RAM, and an I/O unit. The CPU of the cruise-assist ECU runs programs installed in the ROM to implement various functions described later.

A radar device 21, an imaging device 22, an accelerator sensor 23, a brake sensor 24, a steering sensor 25, and a vehicle speed sensor 23 are connected to the cruise-assist ECU 10 as sensor devices for inputting various pieces of detected information to the cruise-assist ECU 10.

For example, the radar device 21 is an available millimeter radar transmitting a high-frequency signal within a millimeter wave range as its transmission waves, and is mounted at, for example, the center of the front end of the own vehicle 40. The radar device 21 has a center axis extending, from the center of the front end of the own vehicle 40, in the travelling direction of the own vehicle 40. The radar device 21 has a predetermined detection range that has a predetermined view angle, such as a detection angle, or scanning angle, and extends in the right and left direction around the center axis. That is, the radar device 21 is capable of detecting the position of an object within the detection range.

Specifically, the radar device 21 transmits probe waves to the detection range through a transmitting antenna, and receives reflected waves, i.e. echoes, based on reflection of the transmitted radar waves by an object through respective receiving antennas. The radar device 21 calculates the distance of the object from the own vehicle 40 based on the transmission time of the prove waves and the reception times of the respective reflected waves.

The radar device 21 also calculates the relative speed of the object relative to the own vehicle 40 based on the frequencies of the reflection waves based on reflection of the transmitted radar wave by the object; the frequencies have been changed based on Doppler effect.

In addition the radar device 21 calculates the azimuth of the object based on the differences in phase between the reflection waves received by the respective receiving antennas.

Note that the radar device 21 is capable of identifying the relative position of the object relative to the own vehicle 40 based on the calculated position and azimuth of the object. Note that the radar device 21 performs, in the predetermined period, referred to as a first period, a task of 1. Transmitting the radar wave 2. Receiving the reflection waves based on reflection of the transmitted radar wave 3. Calculating the reflection position, i.e. the relative position of an object and the own vehicle 40, and the relative speed of the object relative to the own vehicle 40 in accordance with the received reflection waves Then, the radar device 21 sends the reflection position and the relative speed of the object to the cruise-assist ECU 10 as first detection information. Note that objects detected by the radar device 21 will be referred to as radar-based objects.

Figure 6:
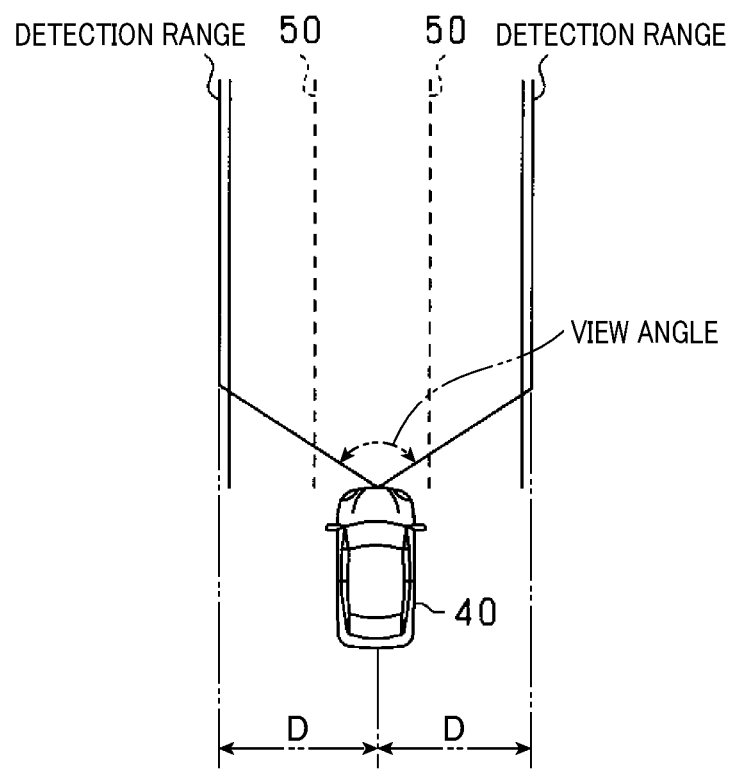
FIG. 6 is a view illustrating a method of detecting the shape of a road according to the third embodiment of the present invention.

FIG. 6 illustrates an example of the detection range of the radar device 21. As illustrated in FIG. 6, the detection range is configured to 1. Horizontally expand from the radar-wave transmitting point of the radar device 21 at the predetermined view angle up to a predetermined distance D
2. Thereafter, extend in the travelling direction of the own vehicle 40 up to a predetermined length Note that the irradiating range of the radar waves, i.e. radar beams, of the radar device 21 is usually set to have a fan beam pattern that expands from the radar-wave transmitting point around the center axis. That is, the irradiating range of the radar waves is wider in the horizontal direction than the detection range. From this viewpoint, the first embodiment is configured such that, for example, information detected out of the detection range is not used by the cruise-assist ECU 10 described later. For this reason, the detection range of the radar device 21 has the shape illustrated in FIG. 6.

The imaging device 22 is designed as a monocular imaging device, such as a CCD camera device, a CMOS image sensor device, or a near-infrared camera device. For example, the imaging device 22 is mounted to the center of the own vehicle 40 in the vehicle width direction at a predetermined height, and has an optical axis extending in front of the own vehicle 40. The imaging device 22 has a region, i.e. an imaging range, that horizontally extends around the optical axis within a predetermined angular range, i.e. a predetermined angle of view. The imaging device 22 captures, from the predetermined height, from a higher point of view, images of the region, i.e. the imaging range.

The imaging device 22 extracts, from a captured image, i.e. a frame image, feature points each indicative of the existence of an object. Specifically, the imaging device 22 extracts edge points from the captured image based on light-intensity information included in the captured image. Then, the imaging device 22 performs Hough transform of the extracted edge points. The Hough transform is capable of extracting, as feature points, points on a straight line on which some of the edge points are aligned, and/or points at which straight lines intersect. Note that the imaging device 22 performs, in a second period different from the first period of the radar device 21, a task of 1. Capturing a frame image
2. Extracting feature points for an object The imaging device 22 sends, to the cruise-assist ECU 10, the results of extracting the feature points as second detection information for the object as second detection information. Objects detected by the imaging device 22 will be referred to as image-based objects.

The accelerator sensor 23 is mounted to an accelerator pedal of the own vehicle 40, and is operative to detect an amount of the driver's operation of the accelerator pedal upon the driver's operation of the accelerator pedal.

The brake sensor 24 is mounted to a brake pedal of the own vehicle 40, and is operative detect an amount of the driver's operation of the brake pedal upon the driver's operation of the brake pedal.

The steering sensor 25 is mounted to a steering of the own vehicle 40, and is operative to detect a direction and an amount of the driver's operation of the steering.

The vehicle speed sensor 26 is mounted to the rotary shaft that transfers torque to the driving wheels of the own vehicle 40, and is operative to obtain the speed of the own vehicle 40 based on the number of turns of the rotary axis.

The own vehicle 40 includes a warning device 31, a brake device 32, and seatbelt devices 33 as its safety devices that are driven in response to control instructions sent from the cruise-assist ECU 10.

The warning device 31 includes a speaker and/or a display mounted in the compartment of the own vehicle 40. The warning device 31 is configured to output warnings including, for example, warning sounds and/or warning messages to inform the driver of a risk of collision in response to a control instruction sent from the cruise-assist ECU 10 when the cruise-assist ECU 10 determines that there is high risk of collision of the own vehicle 40 with an object.

The brake device 32 is configured to brake the own vehicle 40. The brake device 32 is activated in response to a control instruction sent from the cruise-assist ECU 10 when the cruise-assist ECU 10 determines that there is a high risk of collision of the own vehicle 40 with an object. Specifically, the brake device 32 performs a brake-assist function of increasing braking force, which is based on the driver's brake operation, to the own vehicle 40, or an automatic brake function of automatically braking the own vehicle 40 if there is no braking operation by the driver.

The seat belt devices 33 serve as pretensioners each for tightening the corresponding seat belt mounted to the corresponding seat of the own vehicle 40. The seat belt devices 33 each performs a preliminary operation to preliminarily tighten the corresponding seat belt in response to a control instruction sent from the cruise-assist ECU 10 when the cruise-assist ECU 10 determines that there is a high risk of collision of the own vehicle 40 with an object. The seat belt devices 33 each tighten the corresponding seat belt when the cruise-assist ECU 10 determines that a collision cannot be avoided to thereby hold the corresponding occupant, such as the driver, in the corresponding seat securely, thus protecting the corresponding occupant.

The cruise-assist ECU 10 functionally includes an object recognizer 11, an operation state determiner 12, an activation timing controller 13, an activation determiner 14, and a control processor 15.

The object recognizer 11 includes a first obtainer 11a serving as a first obtaining means, a second obtainer 11b serving as a second obtaining means, and a type determiner 11c serving as a type determining means.

The first obtainer 11a periodically obtains the first detection information from the radar device 21. The second obtainer 11b periodically obtains the second detection information from the imaging device 22.

The object recognizer 11 obtains first position information for each radar-based object based on the position of the corresponding radar-based object, i.e. the reflection position of the corresponding radar-based object, and second position information for each image-based object based on the feature points corresponding to the image-based object. Then, the object recognizer 11 determines that a radar-based object and an image-based object are the same object when the corresponding first position information is close to the corresponding second position information. Next, the object recognizer 11 matches the corresponding first position information with the corresponding second position information.

Specifically, if the second position information about an image-based object is located to be close to the first position information about a radar-based object, there is a high probability of a corresponding actual object being located at the position based on the first position information. The state where the first position information about each radar-based object is identical to or close to the second position information about the corresponding image-based object will be referred to as a fusion state. In other words, the fusion state shows that the radar device 21 and the imaging device 22 have each obtained the position of an object with high accuracy.

The object recognizer 11 periodically performs an object recognizing task that includes 1. Obtaining the first detection information for each radar-based object
2. Obtaining the second detection information for each image-based object
3. Obtaining the fusion information about each object detected in the fusion state The object recognizer 11 stores, for each period, the position information about each radar-based object, the position information about each image-based object, and the position information about each object, i.e. each fusion-based object, detected in the fusion state into the memory as a detection history. The fusion information can include identification information.

The position information in each of the first detection information, the second detection information, and the fusion information obtained from an object includes at least 1. A position, i.e. a longitudinal position, of the detected shape of the object in the travelling direction, i.e. the longitudinal direction, of the own vehicle 40
2. A position, i.e. a lateral position, of the detected shape of the object in the direction perpendicular to the travelling direction, i.e. the lateral direction, of the own vehicle 40

For a fusion-based object, the object recognizer 11 refers to the detection history in accordance with identification information about the fusion-based information for each period to correspondingly determine whether the fusion-based object has been continuously in the fusion state. The object recognizer 11 determines that the fusion-based object is located at the corresponding position, i.e. the first position based on the detection result by the radar device 21 upon determination that the fusion-based object has been continuously in the fusion state. In addition, when it is determined that the fusion-based object has not been detected in a period, the object recognizer 11 refers to the detection history for the fusion-based object, and assumes that the fusion-based object was at the previous position, i.e. the position detected in the previous period.

Additionally, the object recognizer 11 performs pattern matching of the second detection information of a fusion-based object with feature patterns of many objects including vehicles, pedestrians, and roadside objects. Then, the object recognizer 11 determines, based on the result of the pattern matching, whether the fusion-based object is a vehicle or a pedestrian. Then, the object recognizer 11 causes the determined type, i.e. a vehicle or a pedestrian, of the fusion-based object to correlate with the corresponding fusion object. Note that the type of pedestrians can include persons who ride bicycles.

Next, the object recognizer 11 causes, for each fusion-based object, the corresponding relative position and relative speed to correlate with one another. Then, the object recognizer 11 calculates, based on the corresponding relative position and relative speed for each fusion-based object, a lateral speed and a longitudinal speed. The lateral speed represents a relative speed in the lateral direction perpendicular to the travelling direction of the own vehicle 40, and the longitudinal speed represents a relative speed in the longitudinal direction, i.e. the travelling direction, of the own vehicle 40.

In addition, the object recognizer 11 classifies the type of each fusion-based object in accordance with the result of the determination of whether the corresponding fusion-based object is a vehicle or a pedestrian, the lateral speed, and the longitudinal speed.

If the fusion-based object is a vehicle, the object recognizer 11 classifies, based on the longitudinal speed, the vehicle into any one of 1. A preceding vehicle travelling in the same direction as the travelling direction of the own vehicle 40 ahead of the own vehicle 40
2. An oncoming vehicle travelling in an oncoming lane ahead of the own vehicle 40 in the travelling direction
3. A stopped vehicle stopped ahead of the own vehicle 40 in the travelling direction If the fusion-based object is a pedestrian, the object recognizer 11 classifies, based on the lateral speed and the longitudinal speed, the vehicle into any one of 1. A preceding pedestrian walking in the same direction as the travelling direction of the own vehicle 40 ahead of the own vehicle 40
2. An oncoming pedestrian walking in the opposite direction of the travelling direction of the own vehicle ahead of the own vehicle 40
3. A stopped pedestrian stopped ahead of the own vehicle 40 in the travelling direction
4. A crossing pedestrian crossing ahead of the own vehicle 40 in the travelling direction In addition, for a radar-based object detected based on only the first detection information, the object recognizer 11 classifies, based on the longitudinal speed, the radar-based object into any one of 1. A preceding object moving in the same direction as the travelling direction of the own vehicle 40 ahead of the own vehicle 40
2. An oncoming object moving in the direction opposite to the travelling direction of the own vehicle 40 ahead of the own vehicle 40 in the travelling direction
3. A stopped object stopped ahead of the own vehicle 40 in the travelling direction Next, the following describes a determination routine for determining whether to activate the safety devices, which is carried out by the activation determiner 14, with reference to FIG. 2.

The activation determiner 14 includes a region setter 14a serving as a region setting means, an activation determining unit 14b serves as an activation determining means, and a collision predictor 14c serving as a collision predicting means.

The region setting unit 14a sets a determination region R that

1. Has a center axis (see a y axis in FIG. 2) extending, from the center of the front end of the own vehicle 40, in the travelling direction of the own vehicle 40
2. Horizontally expands around the center axis at a predetermined angle, i.e. a recognition angle
3. Has a rightward width based on a rightward limit XR in the rightward direction relative to the travelling direction
4. Has a leftward width based on a leftward limit XL in the rightward direction relative to the travelling direction
5. Has a predetermined length, i.e. depth, L from the center of the front end of the own vehicle 40 along the y axis direction.

Note that the center of the front end of the own vehicle 40 corresponds to a probe-wave irradiating point of the radar device 21.

The rightward limit XR and the leftward limit XL are previously determined for each type of object to be recognized. For example, values of the rightward limit XR and the leftward limit XL for a case where the target object is a preceding vehicle are set to be smaller than values of the rightward limit XR and the leftward limit XL for a case where the target object is a pedestrian. This is because such a preceding vehicle is unlikely to undergo rapid lateral movement. In other words, values of the rightward limit XR and the leftward limit XL for a case where the target object is a pedestrian are set to be larger than values of the rightward limit XR and the leftward limit XL for a case where the target object is a preceding vehicle. This is because such a pedestrian has a possibility of rapid lateral movement.

The activation determiner 14b determines whether to activate each of the safety devices in accordance with a time to collision (TTC) and the activation timing for the corresponding one of the safety devices obtained by the operation state determiner 12 and the activation timing controller 13 described in detail later. The activation timings are respectively set for the warning device 31, the brake device 32, and the seatbelt devices 33. Specifically, the activation timing for the warning device 31 is set to be the earliest in all the warning device 31, the brake device 32, and the seatbelt devices 33. This is because, if the driver notices, based on the warning output from the warning device 31, a probability of the own vehicle 40 colliding with the target object 60 to depress the brake pedal, the brake device 32 is activated to brake the own vehicle 40, making it possible to avoid this collision without the cruise-assist ECU 10 outputting the control instruction to the brake device 32.

As the activation timings for the brake device 32, the activation timings are individually determined for the brake-assist function and the automatic brake function. These activation timings can be set to be equal to each other or different from each other.

In the first embodiment, the activation timing for the brake-assist function and the activation timing for the seatbelt devices 33 during the brake-assist function being activated are for example set to be equal to each other. In the first embodiment, the activation timing for the automatic brake function and the activation timing for the seatbelt devices 33 during the automatic brake function being activated are for example set to be equal to each other.

The collision predictor 14c calculates a time to collision (TTC), which represents a margin time until which the own vehicle 40 would collide with a target object, in accordance with the longitudinal speed and longitudinal distance of the target object obtained from the object recognizer 11. The collision predictor 14c can use the relative acceleration of the target object relative to the own vehicle 40 in place of the longitudinal speed.

Figure 2:
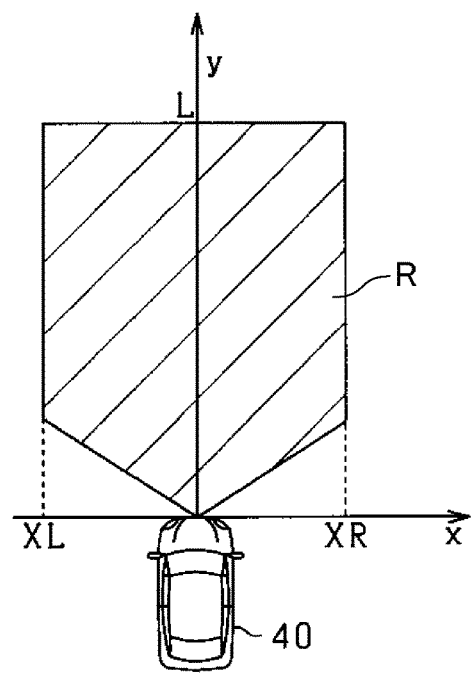
FIG. 2 is a view illustrating a determination region for safely activating a safety device.

The depth L of the determination region R illustrated in FIG. 2 is defined based on the activation timing for each safety device and the relative speed of the target object relative to the own vehicle 40. This is because multiplying the relative speed of the target object relative to the own vehicle 40 by the activation timing for each safety device enables the distance of the target object to be obtained. Specifically, the entrance of the target object into the determination range R means that the TTC is shorter than the activation timing for the corresponding safety device, i.e. than a threshold serving as an index indicative of the activation timing.

The activation determiner 14 compares the calculated TTC with the activation timings of the respective safety devices, i.e. the thresholds representing the respective activation timings.

Specifically, the thresholds are respectively set for the warning device 31, the brake device 32, and the seatbelt devices 33. The relative sizes among the thresholds are identical to the above relative sizes among the activation timings.

If the own vehicle 40 approaches the target object 60, so that the TTC becomes lower than the threshold for the activation timing for the warning device 31, the activation determiner 14 determines that it is time to activate the warning device 31, thus transmitting an activation determination signal of the warning device 31 to the control processor 15. The control processor 15 transmits the control instruction to the warning device 31 in response to receiving the activation determination signal. This causes the warning device 31 to be activated to output warnings, thus informing the driver of a risk of collision.

After activation of the warning device 31, if the own vehicle 40 further approaches the target object 60 with the brake pedal being not depressed by the driver, so that the TTC further decreases to become lower than the threshold for the activation timing for the automatic brake function of the brake device 32, the activation determiner 14 determines that it is time to activate the automatic brake function of the brake device 32, thus transmitting an activation determination signal of the automatic brake function of the brake device 32 to the control processor 15. The control processor 15 transmits the control instruction to each of the brake device 32 and seatbelt devices 33 in response to receiving the activation determination signal. This causes the brake device 32 to be activated to perform braking control of the own vehicle 40, and at least one the seatbelt devices 33 to be activated to preliminarily tighten the corresponding at least one seatbelt.

On the other hand, after activation of the warning device 31, if the own vehicle 40 further approaches the target object 60 despite the driver's depression of the brake pedal, so that the TTC further decreases to become lower than the threshold for the activation timing for the brake-assist function of the brake device 32, the activation determiner 14 determines that it is time to activate the brake-assist function of the brake device 32, thus transmitting an activation determination signal of the brake-assist function of the brake device 32 to the control processor 15. The control processor 15 transmits the control instruction to each of the brake device 32 and at least one seatbelt device 33 in response to receiving the activation determination signal. This causes the brake device 32 to be activated to increase braking force based on the driver's depression of the braking pedal, and the at least one seatbelt device 33 to be activated to preliminarily tighten the corresponding at least one seatbelt.

If a safety device is activated while a driver's collision avoidance operation, such as an accelerator-pedal operation, a brake-pedal operation, and/or a steering operation, is actually carried out, the driver may experience the feeling of troublesome activation of the safety device. Note that a driver's accelerator-pedal operation or a driver's brake-pedal operation corresponds to, for example, a collision avoidance operation in the longitudinal direction of the own vehicle 40, and a driver's steering operation corresponds to, for example, a collision avoidance operation in the lateral direction of the own vehicle 40.

From this viewpoint, the cruise-assist ECU 10 performs a task of delaying the activation timing for each safety device while the driver's collision avoidance operation is carried out. The task of delaying the activation timing for each safety device means a task of decreasing the threshold corresponding to the activation timing. Specifically, the threshold corresponding to the activation timing for each safety device is used to be compared with the TTC. For this reason, reducing the threshold corresponding to the activation timing from its initial value results in the corresponding safety device being activated upon the TTC becoming smaller than the threshold value that is smaller than the initial value.

Specifically, the operation state determiner 12 includes a first determiner 12a serving as a first determining means, and a second determiner 12b serving as a second determining means.

The first determiner 12a determines whether the accelerator pedal is operated by the driver, and whether the brake pedal is operated by the driver in accordance with the detection result of the accelerator sensor 23 and the detection result of the brake sensor 24. Then, the first determiner 12a sends the determination result to the activation timing controller 13.

The second determiner 12b determines whether the steering is operated by the driver in accordance with the detection result of the steering sensor 25. Then, the second determiner 12b sends the determination result to the activation timing controller 13.

The activation timing controller 13 of the cruise-assist ECU 10 controls the activation timing for each safety device based on the determination result sent from the first determiner 12a and the determination result sent from the second determiner 12b.

For example, if 2.0 seconds is set as the threshold to a safety device, the activation timing controller 13 performs an activation timing control task to reduce the threshold corresponding to the activation timing from 2.0 seconds to 1.7 seconds upon the driver's collision avoidance operation being detected by the first determiner 12a or the second determiner 12b.

Figure 3:
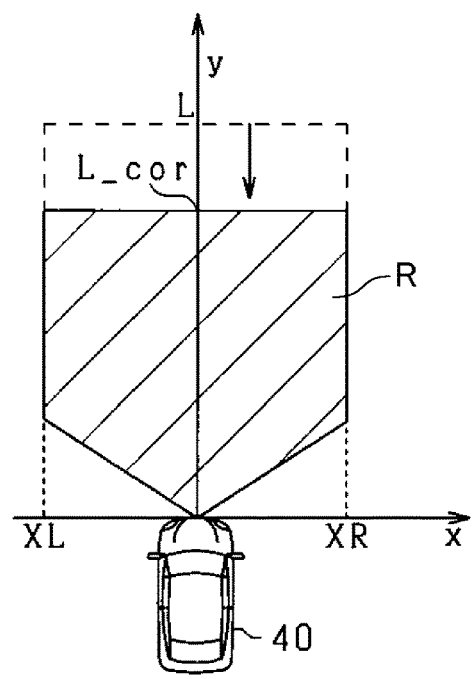
FIG. 3 is a view illustrating a determination region upon executing a cruise-assist routine according to the first embodiment.

FIG. 3 illustrates the determination region R for a target object corresponding to a safety device whose activation timing has been delayed. Delaying the activation timing causes the length L, which is a value corresponding to the product of the activation timing and the relative speed of the target object relative to the own vehicle 40, to be corrected to a length L_cor. This results in more time required for the target object into the determination region R.

Executing the activation timing control task enables the activation of each safety device with a driver's collision avoidance operation to be delayed as compared with the activation of each safety device without driver's collision activation operations. If a driver's collision avoidance operation results in the relative speed between the own vehicle 40 and the target object decreasing to correspondingly increase the TTC of the target object to the own vehicle 40, or in the target object having horizontally moved outside the determination region R, this means that there is no probability of the target object colliding with the own vehicle 40. This therefore results in no activation of the safety devices for the target object.

Note that the activation timing controller 13 prevents execution of the task to delay the activation timing for a safety device if the safety device has been activated by the cruise-assist ECU 10. This aims to prevent, after activation of the safety device without driver's intention, the operation of the safety device from being interrupted due to the activation timing delaying task for the safety device due to driver's operation.

Figure 4:
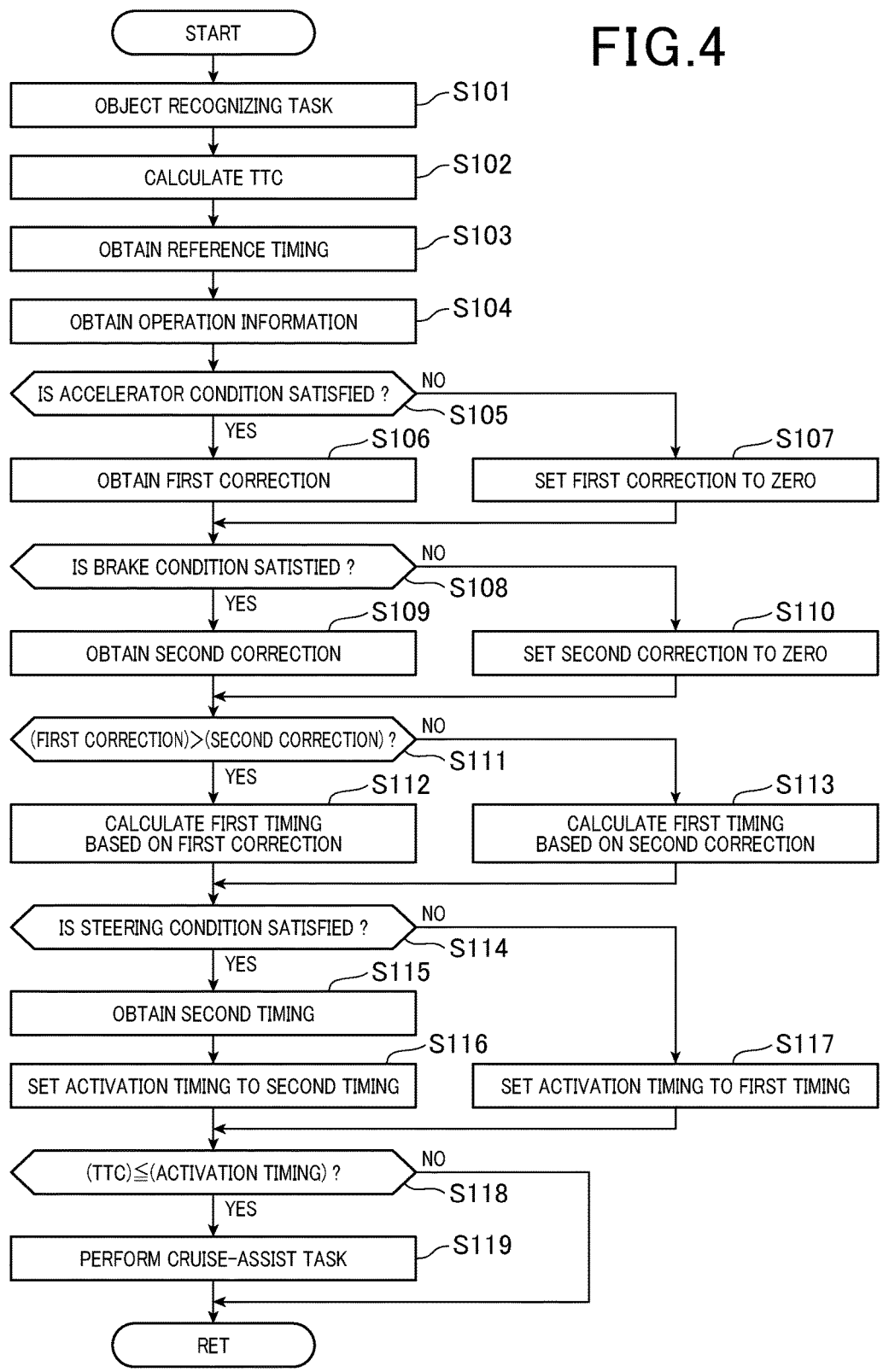
FIG. 4 is a flowchart illustrating the cruise-assist routine according to the first embodiment.

Next, the following describes an example of a cruise-assist routine including the activation timing control task, which is carried out by the cruise-assist ECU 10, with reference to FIG. 4. The cruise-assist routine is carried out with predetermined intervals for each object existing in the travelling direction of the own vehicle 40. Note that, in FIG. 4, the timing means the threshold corresponding to the timing.

First, the cruise-assist ECU 10 performs the object recognizing task in accordance with the first detection information from the radar device 21 and the second detection information from the imaging device 22 in step S101. Then, the cruise-assist ECU 10 calculates the TTC for each recognized target object in step S102.

Next, the cruise-assist ECU 10 obtains a reference threshold corresponding to a reference timing for activating each safety device in step S103. The reference threshold corresponding to the reference timing is previously determined for each safety device and for each type of target objects, and is stored beforehand in the memory of the cruise-assist ECU 10.

Specifically, the cruise-assist ECU 10 reads, from the memory, a reference threshold corresponding to each safety device and corresponding to the type of the target object. Then, the cruise-assist ECU 10 obtains, from each of the accelerator sensor 23, brake sensor 24, and steering sensor 25, the corresponding detection result, that is, the driver's operation information about the corresponding one of the accelerator pedal, brake pedal, and steering of the own vehicle 40 in step S104.

Following the operation in step S104, the cruise-assist ECU 10 determines whether a condition representing a driver's accelerator-pedal operation is satisfied in accordance with the operation information obtained from the accelerator sensor 23 in step S105. Specifically, the cruise-assist ECU 10 determines whether a collision avoidance operation in the longitudinal direction of the own vehicle 10 has been carried out by a driver's accelerator-pedal operation. In particular, the cruise-assist ECU 10 according to the first embodiment determines whether the depressed accelerator pedal, i.e. the on-state accelerator pedal, has been released, i.e. is off, after it is determined that there is a collision probability between the own vehicle 40 and the target object. This is based on the reason that driver's interruption of the on operation of the accelerator pedal is estimated as driver's intention to reduce the speed of the own vehicle 40. Note that the cruise-assist ECU 10 is configured to determine whether there is a collision probability between the own vehicle 40 and the target object based on determination of whether the corresponding TTC has been calculated.

Note that the cruise-assist ECU 10 is not capable of determining whether there is a driver's speed reduction intention while the accelerator pedal is in the off state. For this reason, in this case, the cruise-assist ECU 10 can determine that the condition representing a driver's accelerator-pedal operation is not satisfied.

Upon determination that the condition representing a driver's accelerator-pedal operation is satisfied (YES in step S105), the cruise-assist ECU 10 obtains a first correction for the reference timing in step S106. Otherwise, upon determination that the condition representing a driver's accelerator-pedal operation is not satisfied (NO in step S105), the cruise-assist ECU 10 sets the first correction for the reference timing to be zero in step S107.

The first correction is previously determined, and stored beforehand in the memory. The cruise-assist ECU 10 reads, from the memory, the corresponding first correction to thereby obtain the first correction. Note that the cruise-assist ECU 10 can change the first correction depending on change of the operated amount of the accelerator pedal; the operated amount of the accelerator pedal is included in the operation information obtained from the accelerator sensor 23.

Similarly, the cruise-assist ECU 10 determines whether a condition representing a driver's brake-pedal operation is satisfied in accordance with the operation information obtained from the brake sensor 24 in step S108. Specifically, the cruise-assist ECU 10 determines whether a collision avoidance operation in the longitudinal direction of the own vehicle 10 has been carried out by a driver's brake-pedal operation. In particular, the cruise-assist ECU 10 according to the first embodiment determines whether the brake pedal has been depressed after it is determined that there is a collision probability between the own vehicle 40 and the target object.

Upon determination that the condition representing a driver's brake-pedal operation is satisfied (YES in step S108), the cruise-assist ECU 10 obtains a second correction for the reference timing in step S109. Otherwise, upon determination that the condition representing a driver's accelerator-pedal operation is not satisfied (NO in step S108), the cruise-assist ECU 10 sets the second correction for the reference timing to be zero in step S110.

The second correction is also previously determined as with the first correction, and stored beforehand in the memory. The cruise-assist ECU 10 reads, from the memory, the corresponding second correction to thereby obtain the second correction. Note that the cruise-assist ECU 10 can change the second correction depending on change of the operated amount of the brake pedal; the operated amount of the brake pedal is included in the operation information obtained from the brake sensor 24.

After the first correction and the second correction are obtained, the cruise-assist ECU 10 compares the first correction with the second correction in step S111.

Upon the first correction being larger than the second correction (YES in step S111), the cruise-assist ECU 10 subtracts the first correction from the reference threshold corresponding to the reference timing to thereby obtain a first threshold corresponding to a first timing in step S112.

Otherwise, upon the second correction being larger than the first correction (NO in step S111), the cruise-assist ECU 10 subtracts the second correction from the reference threshold corresponding to the reference timing to thereby obtain a second threshold corresponding to a second timing in step S113.

For example, if the reference threshold corresponding to the reference timing is set to 2.0 seconds, the first correction is set to 0.3 seconds, and the second correction is set to 0.2 seconds, the first threshold corresponding to the first reference timing is obtained as 1.7 seconds. Specifically, activating the corresponding safety device at the first timing enables the activation timing for the corresponding safety device to be delayed as compared with a case of activating the corresponding safety device at the reference timing. That is, if the accelerator pedal and brake pedal are both operated by the driver, the cruise-assist ECU 10 uses one of the first correction and the second correction, which is larger than the other, to thereby correct the reference timing, i.e. the reference threshold corresponding to the reference timing.

Otherwise, upon determination that the condition representing a driver's accelerator-pedal operation and the condition representing a driver's brake-pedal operation are not satisfied, the first and second corrections are both set to zero. For this reason, the determination in step S111 is NO, so that cruise-assist routine proceeds to step S113.

In step S113, the cruise-assist ECU 10 subtracts the second correction being zero from the reference threshold corresponding to the reference timing. That is, if the condition representing a driver's accelerator-pedal operation and the condition representing a driver's brake-pedal operation are not satisfied, the reference threshold corresponding to the reference timing becomes the first threshold corresponding to the first timing. Note that the cruise-assist ECU 10 can perform another known procedure to set the reference threshold corresponding to the reference timing to be the first threshold corresponding to the first timing if the condition representing a driver's accelerator-pedal operation and the condition representing a driver's brake-pedal operation are not satisfied.

Next, the cruise-assist ECU 10 determines whether a condition representing a driver's steering operation is satisfied in accordance with the operation information obtained from the steering sensor 25 in step S114. Specifically, the cruise-assist ECU 10 determines whether a collision avoidance operation in the lateral direction of the own vehicle 10 has been carried out by a driver's steering operation. In particular, the cruise-assist ECU 10 according to the first embodiment determines whether the driver's steering operation is the rightward turning or the leftward turning. At that time, the cruise-assist ECU 10 obtains the position of the target object and the relative speed of the target object relative to the own vehicle 40 from the object recognizer 11.

For example, let us consider a case where the target object is located rightward relative to the center axis, i.e. the y axis, in front of the own vehicle 40, and the target object is moving in the left direction. In this case, when the driver's steering operation is the leftward turning, the cruise-assist ECU 10 determines that the driver's steering operation is not intended to avoid a collision with the target object.

In contrast, let us consider a case where the target object is located rightward relative to the center axis, i.e. the y axis, in front of the own vehicle 40, and the target object is moving in the left direction. In this case, when the driver's steering operation is the rightward turning, the cruise-assist ECU 10 determines that the driver's steering operation is intended to avoid a collision with the target object.

In addition, let us consider a case where the target object is located rightward relative to the center axis, i.e. the y axis, in front of the own vehicle 40, and the target object is moving in the right direction. In this case, when the driver's steering operation is the leftward turning, the cruise-assist ECU 10 determines that the driver's steering operation is intended to avoid a collision with the target object.

In contrast, let us consider a case where the target object is located rightward relative to the center axis, i.e. the y axis, in front of the own vehicle 40, and the target object is moving in the right direction. In this case, when the driver's steering operation is the rightward turning, the cruise-assist ECU 10 determines that the driver's steering operation is not intended to avoid a collision with the target object.

Note that the determination operation for a case where the target object is located leftward relative to the center axis, i.e. the y axis, in front of the own vehicle 40 is similar to the above determination operation for the case where the target object is located rightward relative to the center axis, i.e. the y axis, in front of the own vehicle 40.

Specifically, in step S114, the cruise-assist ECU 10 determines that the condition representing a driver's steering operation is satisfied upon the driver's steering operation is intended to avoid a collision with the target object. Otherwise, in step S114, the cruise-assist ECU 10 determines that the condition representing a driver's steering operation is not satisfied upon the driver's steering operation is not intended to avoid a collision with the target object.

Upon determination that the condition representing a driver's steering operation is satisfied (YES in step S114), the cruise-assist ECU 10 obtains the second threshold corresponding to the second timing in step S115. Then, the cruise-assist ECU 10 sets the activation threshold corresponding to the activation timing for activating each safety device to the second threshold in step S116.

The second threshold corresponding to the second timing is previously determined and stored in the memory of the cruise-assist ECU 10. The cruise-assist ECU 10 reads, from the memory, the second threshold corresponding to the second timing, and sets the second threshold as the activation threshold corresponding to the activation timing to activate the corresponding safety device. The second threshold is set to be smaller than the reference threshold.

For example, if the reference threshold corresponding to the reference timing is set to 2.0 seconds, the second threshold is set to 1.5 seconds. Specifically, activating the corresponding safety device at the second timing corresponding to the second threshold enables the activation timing for the corresponding safety device to be delayed as compared with a case of activating the corresponding safety device at the reference timing. Note that the cruise-assist ECU 10 can change the second threshold corresponding to the second timing depending on change of the operated amount of the steering; the operated amount of the steering is included in the operation information obtained from the steering sensor 25.

Note that the correction amount, i.e. the amount of delay, to delay the activation timing in accordance with the steering operation, i.e. the collision avoidance operation in the horizontal direction, is preferably set to be larger than the correction amount, i.e. the amount of delay, to delay the activation timing in accordance with the accelerator-pedal operation or brake-pedal operation, i.e. the collision avoidance operation in the longitudinal direction. However, the correction amount to delay the activation timing in accordance with the accelerator-pedal operation, the correction amount to delay the activation timing in accordance with the brake-pedal operation, and the correction amount to delay the activation timing in accordance with the steering operation can be set to be identical to each other. The correction amount to delay the activation timing in accordance with the steering operation can be set to be smaller than the correction amount to delay the activation timing in accordance with the accelerator-pedal operation or brake-pedal operation.

Otherwise, upon determination that the condition representing a driver's steering operation is not satisfied (NO in step S114), the cruise-assist ECU 10 sets the activation threshold corresponding to the activation timing for activating each safety device to the first threshold corresponding to the first timing in step S117.

After completion of the operation in step S116 or step S117, the cruise-control ECU 10 compares the activation threshold corresponding to the activation timing with the TTC for the target object in step S118. Upon determination that the TTC is equal to or smaller than the activation threshold corresponding to the activation timing as a result of the comparison (YES in step S118), the cruise-assist ECU 10 determines that the TTC has reached the activation timing. Then, the cruise-assist ECU 10 sends a control command signal, i.e. an activation start signal, to the corresponding safety device, thus activating the safety device in step S119, and thereafter, terminates the cruise-assist routine.

Otherwise, upon determination that the TTC is larger than the activation threshold corresponding to the activation timing as a result of the comparison (NO in step S118), the cruise-assist. ECU 10 terminates the cruise-assist routine.

As described above, the drive-assist. ECU 10 serving as a cruise-assist apparatus achieves the following advantageous effects.

The cruise-assist ECU 10 controls the activation timing for each safety device from the reference timing initially set for the corresponding safety device to the first timing or second timing that is later than the reference timing upon determination that a driver's collision avoidance operation is carried out.

If a driver's accelerator-pedal operation or a driver's brake-pedal operation results in an increase of the distance between the own vehicle 40 and the target object and/or in a reduction of the relative speed of the target object relative to the own vehicle 40, the TTC is likely to be maintained to be equal to or larger than the activation threshold corresponding to the activation timing. For this reason, the activation-timing control of the drive-assist ECU 10 reduces unnecessary activation of the safety devices if the driver operates the accelerator pedal or the brake pedal.

If the lateral position of the target object moves toward the outside of the determination region in the lateral direction relative to the own vehicle 40 due to a driver's steering operation, the TTC is likely to be maintained to be equal to or larger than the activation threshold corresponding to the activation timing. For this reason, the drive-assist ECU 10 reduces unnecessary activation of the safety devices if the driver operates the steering.

Commonly, a driver's steering operation enables a collision between a corresponding vehicle and an object to be avoided independently of a driver's accelerator-pedal operation or a driver's brake-pedal operation.

The cruise-assist ECU 10 according to the first embodiment sets the second threshold corresponding to the second timing as the activation threshold corresponding to the activation timing in priority to the calculated first threshold corresponding to the first timing upon obtaining the second threshold corresponding to the second timing based on a driver's steering operation. For this reason, the cruise-assist ECU 10 activates the safety device at a more proper timing if the driver operates the steering independently of a driver's accelerator-pedal operation or a driver's brake-pedal operation.

The cruise-assist ECU 10 uses one of the first correction based on a driver's accelerator-pedal operation and the second correction based on a driver's brake-pedal operation, which is larger than the other thereof, to thereby calculate the first threshold corresponding to the first tinning. This configuration prevents the first threshold corresponding to the first tinning from being excessively reduced as compared with a case to use the sum of the first and second corrections to calculate the first threshold corresponding to the first timing. This therefore prevents excessive delay of the activation of the corresponding safety device. Because drivers commonly operate the accelerator pedal and brake pedal simultaneously, it is sufficient to correct the activation timing of the corresponding safety device using one of the first and second corrections.

After start of activating a safety device, the cruise-assist ECU 10 is configured to prevent execution of the task of delaying the activation timing of the safety device. This configuration prevents, after activation of the safety device without driver's intention, the operation of the safety device from being interrupted due to the task of delaying the activation timing of the safety device due to driver's operation.

Second Embodiment

The overall structure of the cruise-assist ECU 10, which serves as a cruise-assist apparatus according to the second embodiment, is substantially identical to the overall structure of the cruise-assist ECU 10 according to the first embodiment. Some of the functions and a part of the cruise-assist routine of the cruise-assist ECU 10 according to the second embodiment are different from the corresponding functions acid the cruise-assist routine of the cruise-assist ECU 10 according to the first embodiment.

Figure 5:
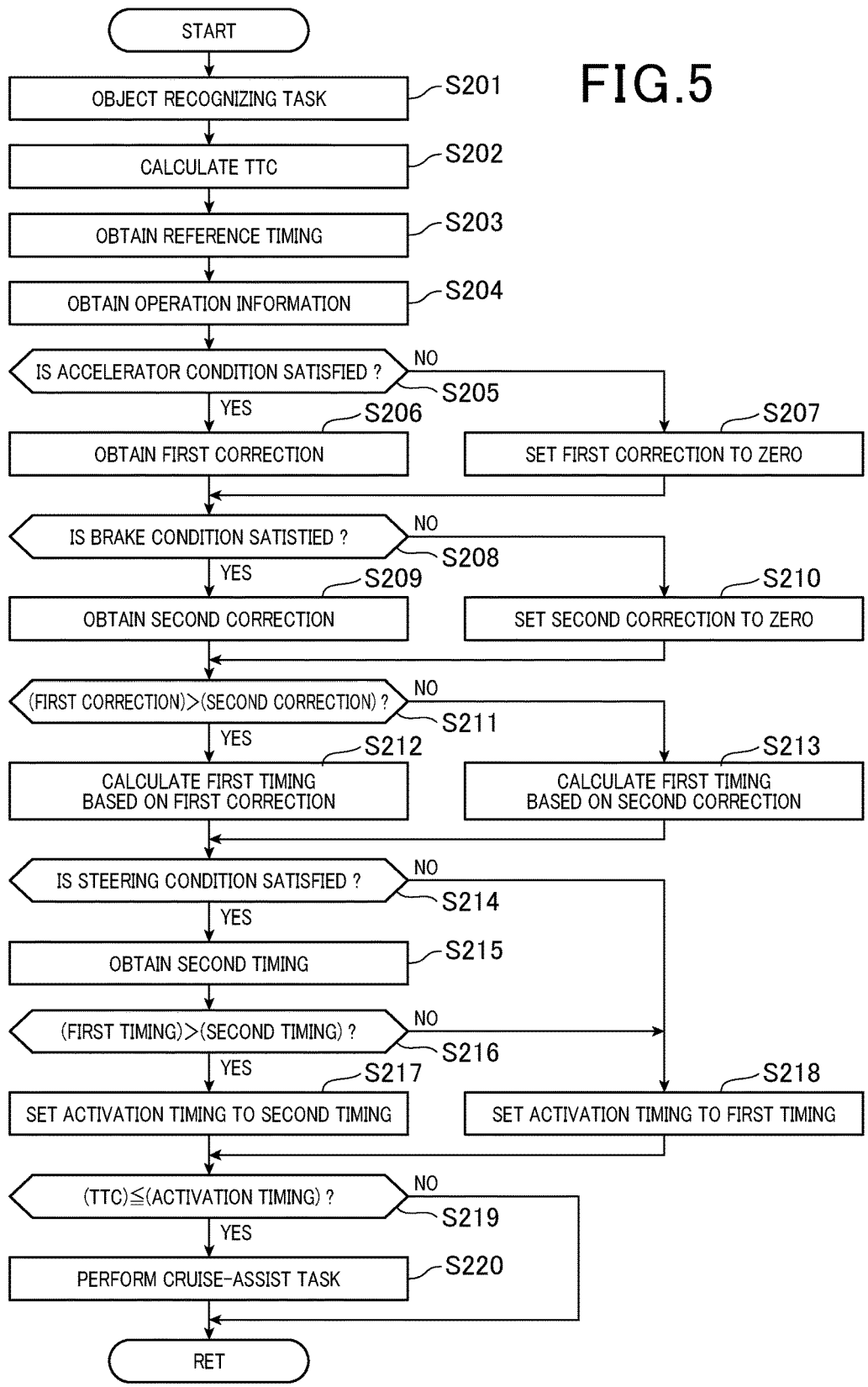
FIG. 5 is a flowchart illustrating a cruise-assist routine according to the second embodiment of the present invention.

FIG. 5 is a flowchart illustrating an example of a cruise-assist routine carried out by the cruise-assist ECU 10 according to the second embodiment. The cruise-assist routine is carried out at predetermined intervals for each object existing in the travelling direction of the own vehicle 40. Note that, in FIG. 5, the timing means the threshold corresponding to the timing. In the cruise-assist routine illustrated in FIG. 5, the operations in steps S201 to S213 are substantially identical to the operations in steps S101 to S113 of the cruise-assist routine illustrated in FIG. 4, so that the descriptions of them are omitted. Note that the operation in step S212 or S213 calculates the first threshold corresponding to the first timing in the same manner as the first embodiment.

After completion of the operation in step S212 corresponding to step S112 or the operation in step S213 corresponding to step S113, the cruise-assist ECU 10 determines whether the condition representing a driver's steering operation is satisfied in accordance with the operation information obtained from the steering sensor 25 in step S214.

Upon determination that the condition representing a driver's steering operation is satisfied (YES in step S214), the cruise-assist ECU 10 obtains the second threshold corresponding to the second timing in step S215. Then, the cruise-assist ECU 10 compares the first threshold corresponding to the first timing with the second threshold corresponding to the second timing in step S216.

Upon determination that the first threshold corresponding to the first timing is larger than the second threshold corresponding to the second timing (YES in step S216), i.e. that the second tinning represents the tinning more delaying activation of each safety device, the cruise-assist ECU 10 sets the activation threshold corresponding to the activation timing for activating the corresponding safety device to the second threshold corresponding to the second tinning in step S217.

Otherwise, upon determination that the first threshold corresponding to the first timing is equal to or smaller than the second threshold corresponding to the second timing (NO in step S216), i.e. that the first timing represents the timing more delaying activation of each safety device, the cruise-assist ECU 10 sets the activation threshold corresponding to the activation timing for activating the corresponding safety device to the first threshold corresponding to the first timing in step S218.

After completion of the operation in step S217 or step S218, the cruise-control ECU 10 compares the activation threshold corresponding to the activation timing with the TTC for the target object in step S219. Upon determination that the TTC is equal to or smaller than the activation threshold corresponding to the activation timing as a result of the comparison (YES in step S219), the cruise-assist ECU 10 determines that the TTC has reached the activation timing. Then, the cruise-assist. ECU 10 sends a control command signal, i.e. an activation start signal, to the corresponding safety device, thus activating the safety device in step 220, and thereafter, terminates the cruise-assist routine.

Otherwise, upon determination at the TTC is larger than the activation threshold corresponding to the activation timing as a result of the comparison (NO in step S219), the cruise-assist ECU 10 terminates the cruise-assist routine.

As described above, the cruise-assist ECU 10 according to the second embodiment achieves the following advantageous effect in addition to the advantageous effects achieved by the cruise-assist ECU 10 according to the first embodiment.

The cruise-assist ECU 10 compares the first threshold corresponding to the first timing with the second threshold corresponding to the second timing, and determines, as activation timing of the corresponding safety device, one of the first threshold and the second threshold, which is smaller than the other thereof. This configuration enables activation of the corresponding safety device upon the occurrence of a driver's collision avoidance operation to be delayed as compared with activation of the corresponding safety device upon no driver's collision avoidance operations, thus further reducing unnecessary activation of the corresponding safety device.

Third Embodiment

The overall structure of the cruise-assist ECU 10, which serves as a cruise-assist apparatus according to the third embodiment, is substantially identical to the overall structure of the cruise-assist ECU 10 according to the first embodiment. Some of the functions and a part of the cruise-assist routine of the cruise-assist ECU 10 according to the third embodiment are different from the corresponding functions and the cruise-assist routine of the cruise-assist ECU 10 according to the first embodiment.

An operation state determiner 12 of the cruise-assist ECU 10 according to the third embodiment includes a road shape determiner 12c, which is illustrated by a phantom line in FIG. 1, serving as a road shape determining means Referring to FIG. 6, the road shape determiner 12c extracts, from the second detection information, lane marking lines, such as white lines, 50 painted on the road in the travelling direction of the own vehicle 40. The road shape determiner 12c calculates the curvature of the lane marking lines 50 to correspondingly determine whether the lane marking lines 50 are straight lines or curved lines.

Upon determination that the lane marking lines 50 are straight lines, the road shape determiner 12c estimates that the road on which the own vehicle 40 is travelling has a straight shape. Otherwise, upon determination that the lane marking lines 50 are curved lines, the road shape determiner 12c estimates that the road on which the own vehicle 40 is travelling has a curved shape.

When it is determined that the road on which the own vehicle 40 is travelling has a curved shape, the detected speed and position of a target object in the travelling direction of the own vehicle 40 may contain an error, because the own vehicle 40 has a speed in the lateral direction. Activating a safety device for such a target object may result in unnecessary activation of the safety device although there is actually little risk of collision.

From this viewpoint, the cruise-assist ECU 10 according to the third embodiment performs a task of controlling the activation timing of each safety device in accordance with the road shape determined by the road shape determiner 12c.

Figure 7:
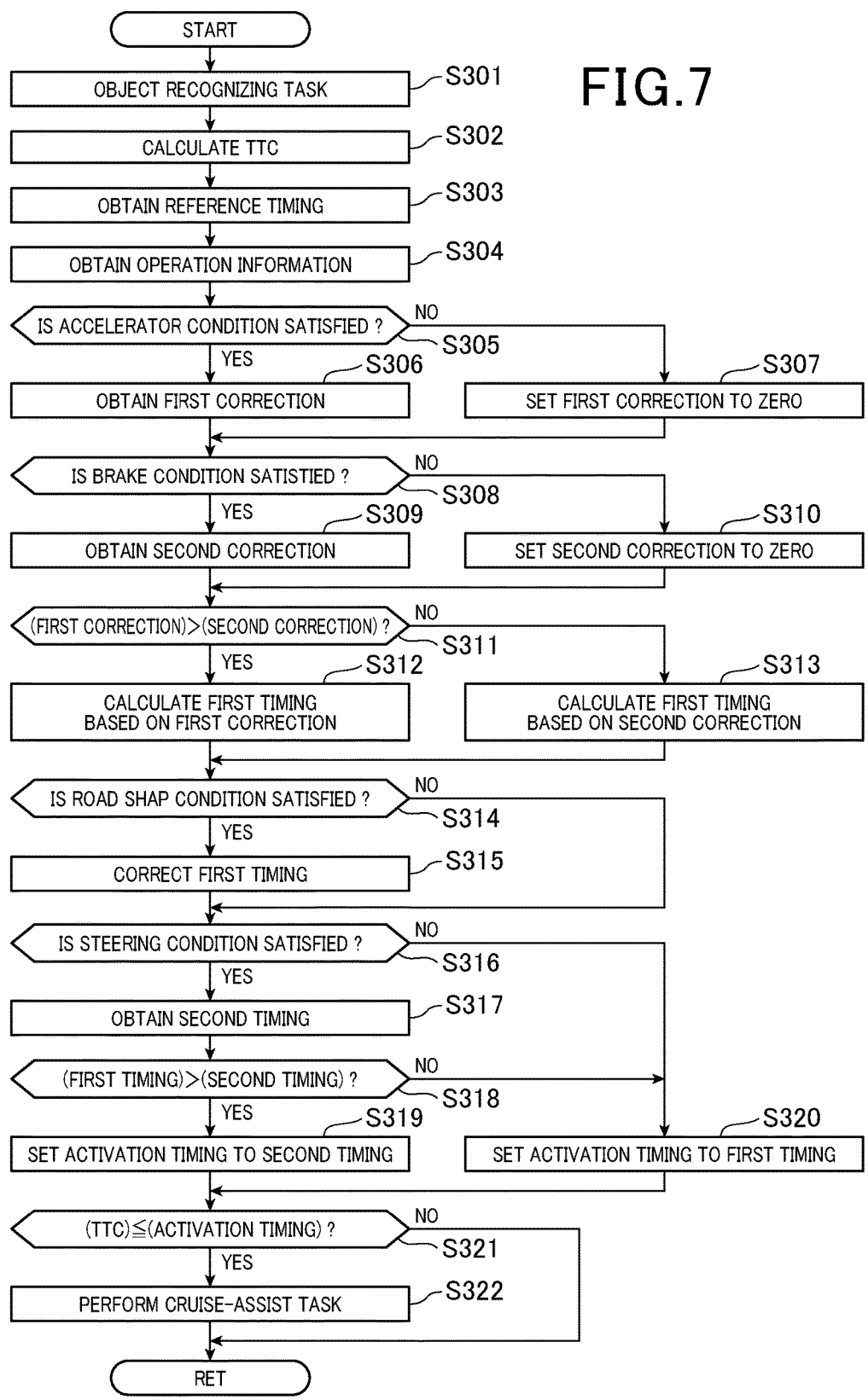
FIG. 7 is a flowchart illustrating a cruise-assist routine according to the third embodiment of the present invention.

FIG. 7 is a flowchart illustrating an example of a cruise-assist routine carried out by the cruise-assist ECU 10 according to the third embodiment. The cruise-assist routine is carried out with predetermined intervals for each object existing in the travelling direction of the own vehicle 40. Note that, in FIG. 7, the timing means the threshold corresponding to the timing. In the cruise-assist routine illustrated in FIG. 7, the operations in steps S301 to S313 are substantially identical to the operations in steps S101 to S113 of the cruise-assist routine illustrated in FIG. 4 or the operations in steps S201 to S213 of the cruise-assist routine illustrated in FIG. 5, so that the descriptions of them are omitted.

Note that the operation in step S312 or S313 calculates the first threshold corresponding to the first timing in the same manner as the first embodiment.

After completion of the operation in step S312 corresponding to step S112 or the operation in step S313 corresponding to step S113, the cruise-assist ECU 10 determines whether the road shape determined by the road shape determiner 12c satisfies a predetermined correction condition in step S314.

When it is determined by the road shape determiner 12c that the shape of the road on which the own vehicle 40 is travelling is not a straight shape, the cruise-assist ECU 10 determines that the road shape satisfies the predetermined correction condition (YES in step S314). Then, the cruise-assist ECU 10 subtracts, from the first threshold corresponding to the first tinning, a predetermined correction, thus correcting the first threshold corresponding to the first timing in step S315.

Otherwise, when it is determined by the road shape determiner 12c that the shape of the road on which the own vehicle 40 is travelling is a straight shape, the cruise-assist ECU 10 determines that the road shape does not satisfy the predetermined correction condition (NO in step S314). Then, the cruise-assist ECU 10 performs the determination in step S316 to determine whether the condition representing a driver's steering operation is satisfied without correcting the first threshold corresponding to the first timing.

Because the operations in steps S316 to S322 are substantially identical to the operations in steps S214 to S220 according to the second embodiment, the descriptions of them are omitted. The cruise-assist ECU 10 can perform compatible operations with the operations steps S114 to S119 in place of the operations in steps S316 to S322.

As described above, the cruise-assist. ECU 10 according to the third embodiment achieves the following advantageous effect in addition to the advantageous effects achieved by the cruise-assist ECU 10 according to the first embodiment or the second embodiment.

If the own vehicle 40 is for example travelling on a curved section of a road, detection of objects may be inaccurately carried out. For this reason, recognizing such an object as a target object and activating a safety device for the target object may result in unnecessary activation of the safety device.

From this viewpoint, the cruise-assist ECU 10 according to the third embodiment is configured such that the first threshold corresponding to the first timing upon determination that the own vehicle 40 is not travelling straight is smaller than the first threshold corresponding to the first timing upon determination that the own vehicle 40 is travelling straight, thus delaying the activation timing of each safety device upon determination that the own vehicle 40 is not travelling straight. This configuration therefore reduces unnecessary activation of each safety device when the own vehicle 40 is not travelling straight.

Fourth Embodiment

The overall structure of the cruise-assist ECU 10, which serves as a cruise-assist apparatus according to the fourth embodiment, is substantially identical to the overall structure of the cruise-assist ECU 10 according to the fourth embodiment. Some of the functions of the cruise-assist ECU 10 according to the fourth embodiment are different from the corresponding functions of the cruise-assist ECU 10 according to the first embodiment.

Figure 8:
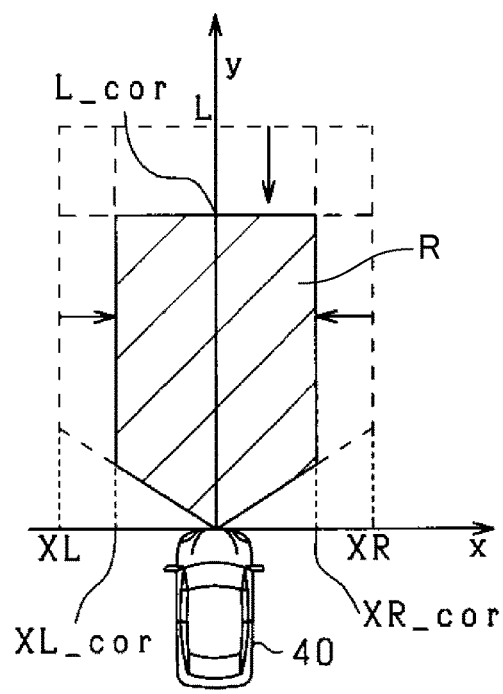
FIG. 8 is a view illustrating a determination region upon a cruise-assist routine according to the fourth embodiment of the present invention being carried out.

The region setter 14a of the activation determiner 14 obtains, from the steering sensor 25, a measurement result indicative of whether there is a driver's steering operation when setting the determination region R. Then, the region setter 14a corrects the rightward limit XR and the leftward limit XL of the determination region. R when there is a driver's steering operation (see FIG. 8), thus determining a corrected rightward limit XR_cor and a corrected leftward limit XL_cor. Note that the region setter 14a can increase the correction, i.e. the reduction amount, of the determination region R with an increase of the amount of a driver's steering when obtaining the corrected rightward limit XR_cor and corrected leftward limit XL_cor.

Note that, as in the first embodiment, cruise-assist ECU 10 sets the second tinning as the activation timing of each safety device, because there is a driver's steering operation. For this reason, the length L of the determination region R is corrected to become a corrected length L_cor.

As described above, the cruise-assist ECU 10 according to the fourth embodiment achieves the following advantageous effect in addition to the advantageous effects achieved by the cruise-assist ECU 10 according to the first embodiment.

If a driver only operates the steering to avoid a collision of the own vehicle 40 with a target object without operating an accelerator pedal and/or a brake pedal, the relative distance between the own vehicle 40 and the target object in the longitudinal direction decreases over time. This may result in there being a probability of the TTC reaching the activation threshold corresponding to the activation timing. At that time, the driver's steering operation causes the relative distance between the own vehicle 40 and the target object to change from inside the determination region to outside of the determination region in the horizontal direction.

From this viewpoint, the cruise-assist ECU 10 according to the fourth embodiment corrects the rightward limit XR and the leftward limit XL in accordance with a driver's steering operation to reduce the rightward limit XR and the leftward limit XL to the corrected rightward limit XR_cor and the corrected leftward limit XL_cor. This establishes the determination region. R based on the corrected rightward limit XR_cor and the corrected leftward limit XL_cor. This enables the corresponding target object to be easily separated from the determination region R in the horizontal direction. This therefore reduces unnecessary activation of each safety device when a collision avoidance operation clue to a driver's steering operation has been carried out.

Fifth Embodiment

The overall structure of the cruise-assist ECU 10, which serves as a cruise-assist apparatus according to the fifth embodiment, is substantially identical to the overall structure of the cruise-assist ECU 10 according to the first embodiment. Some of the functions and a part of the cruise-assist routine of the cruise-assist ECU 10 according to the fifth embodiment are different from the corresponding functions and the cruise-assist routine of the cruise-assist ECU 10 according to the first embodiment.

If a target object is a preceding vehicle 60 travelling in the same direction of the own vehicle 40 in front of the own vehicle 40, the cruise assist ECU 10 according to the fifth embodiment corrects the first threshold corresponding to the first timing to reduce it, thus delaying activation of the corresponding safety device.

For example, the activation timing controller 13 calculates, based on the second detection information, an overlap ratio La of the own vehicle 40 and the preceding vehicle 60; the overlap ratio La represents the rate of overlap between the widths of the own vehicle 40 and the preceding vehicle 60 are overlapped. Then, the cruise-assist ECU 10, i.e. the activation timing controller 13, performs, based on the overlap ratio La, a task of correcting the first threshold corresponding to the first timing. At that time, the activation timing controller 13 serves as an overlap ratio obtaining means.

Figure 9:
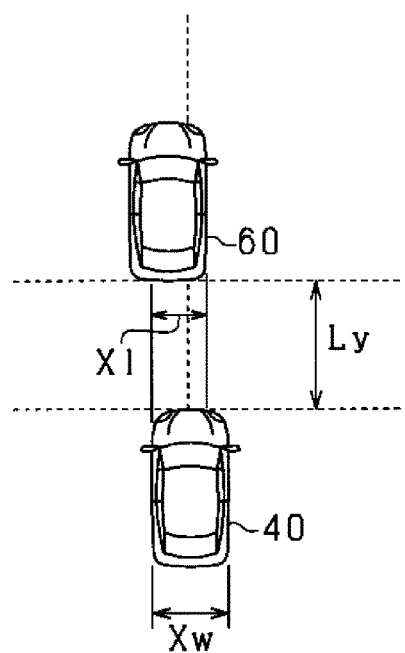
FIG. 9 is a view illustrating a lap rate according to the fifth embodiment of the present invention.

The following describes the overlap ratio La with reference to FIG. 9. Assuming that the width of the own vehicle 40 is represented by Xw and the width of an overlapped region between the width of the preceding vehicle, i.e. the target vehicle, 60 and the width of the own vehicle 40 is represented by X1, the overlap ratio La is obtained by the following equation [1]:

$$La = X1/Xw \qquad [1]$$

Because the larger the overlap ratio La is, the larger the width of the overlapped region between the width of the preceding vehicle 60 and the width of the own vehicle 40 is, the cruise-assist ECU 10, i.e. the activation timing controller 13, may have difficulty in avoiding a collision with the preceding vehicle 60 if the preceding vehicle is braked suddenly. On the other hand, because the smaller the overlap ratio La is, the smaller the width of the overlapped region between the width of the preceding vehicle 60 and the width of the own vehicle 40 is, the cruise-assist ECU 10, i.e. the activation timing controller 13, can easily perform an operation to avoid a collision with the preceding vehicle 60.

From this viewpoint, the cruise-assist ECU 10 obtains, based on the calculated overlap ratio La, a correction for the first threshold corresponding to the first timing. Specifically, the cruise-assist ECU 10 increases the correction, which is subtracted from the first threshold corresponding to the first timing, as the overlap ratio La decreases. This is because, the smaller the overlap ratio La is, the easier avoidance of collision with the target vehicle is. The correction task based on the overlap ratio La can be carried out in place of or in addition to the operation in step S314 or S315 upon a driver's accelerator-pedal operation or a driver's brake-pedal operation being carried out.

As described above, the cruise-assist ECU 10 according to the fifth embodiment achieves the following advantageous effect in addition to the advantageous effects achieved by the cruise-assist ECU 10 according to the first embodiment.

The cruise-assist ECU 10 controls the first timing as an activation timing candidate for the corresponding safety device such that, the smaller the overlap ratio La is, the later the first timing is. This configuration enables, if a driver is able to easily avoid a collision of the own vehicle 40 with the target vehicle, i.e. the preceding vehicle, activation of each safety device to be further delayed upon determination that a driver's collision avoidance operation is carried out.

(Modifications)

In each embodiment, the reference timings, i.e. the reference thresholds for the respective safety devices, can be set to be different for the respective functions of the safety devices. In addition, the first corrections, the second corrections, and/or the second timings can be set to be different for the respective functions of the safety devices. In this modification, the first and second corrections for the warning device 31 can be set to be larger, so that the first and second corrections for the brake-assist function and/or the automatic brake function can be set to be relatively smaller. This is because activation of the brake-assist function and the automatic brake function is limited for a case where a probability of collision between the own vehicle 40 and a target object increases. In each embodiment, the activation timing of the warning device 31 can only be delayed.

The first embodiment is configured such that the reference timing, i.e. the reference threshold, for each safety device is set for each type of target objects. The first embodiment can be configured such that the first correction and/or the second correction, which are used to calculate the first timing, can be set for each type of target objects. Similarly, the first embodiment can be configured such that the second timing can be set for each type of target object.

In the first embodiment, one of the corrections described in the third to fifth embodiments can be used to calculate the first timing. i.e. the first threshold.

If the own vehicle 40 is travelling on a curved section of a road, it is possible to determine whether to activate each safety device based on the corresponding reference timing, i.e. the reference threshold, without obtaining the first timing, i.e. the first threshold, and the second timing, i.e. the second threshold. In curved sections, steering operations are frequently carried out rather than linear sections, so that it is difficult to determine whether each steering operation is intended to avoid a collision between the own vehicle 40 and a target object. If the own vehicle 40 is travelling on a curved section of a road, the first timing, i.e. the first threshold, can be set to the activation timing, i.e. activation threshold, without obtaining the second timing, i.e. the second threshold.

The operation state determiner 12 according to the third embodiment is configured to determine whether the own vehicle 40 is travelling straight in accordance with the lane marking lines 50 imaged by the imaging device 22.

Figure 10:
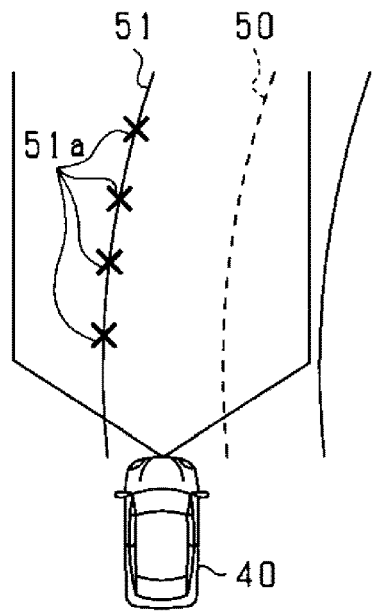
FIG. 10 is a view illustrating another method of detecting the shape of a road according to a modification of each embodiment of the present invention.

In contrast, the operation state determiner 12 can determine whether the own vehicle 40 is travelling straight in accordance with the positions 51a of plural points of a road structure 51, such as a guardrail, detected by the radar device 21 (see FIG. 10).

Figure 11:
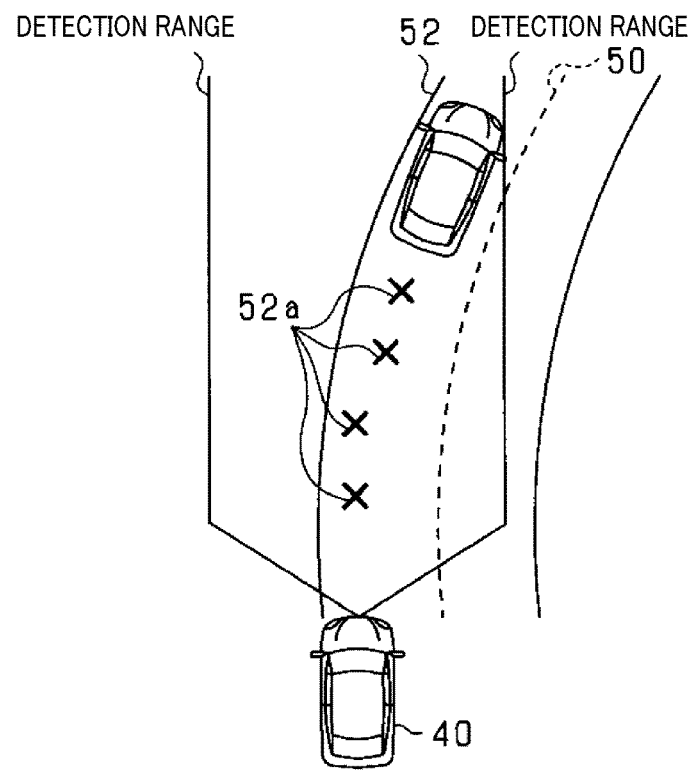
FIG. 11 is a view illustrating a further method of detecting the shape of a road according to a modification of each embodiment of the present invention.

In addition, in the situation where the own vehicle 40 is following a preceding vehicle 52 (see FIG. 11), the operation state determiner 12 can be configured to determine whether the preceding vehicle 52 is travelling straight in accordance with the history of the detected positions 52a of the preceding vehicle 52, and use the determination result of whether the preceding vehicle 52 is travelling straight as the determination result of whether the own vehicle 40 is travelling straight.

A yaw rate sensor 100 can be provided in the own vehicle 40; the yaw rate sensor 100 is illustrated by a phantom line in FIG. 1. The operation state determiner 12 can be configured to obtain acceleration of the own vehicle 40 in its turning direction of the own vehicle 40 using the yaw rate sensor 100, and determine whether the own vehicle 40 is meandering in accordance with the obtained acceleration of the own vehicle 40 in its turning direction. The first timing, i.e. the first threshold, can be corrected based on a result of the determination of whether the own vehicle 40 is meandering.

Figure 12A:
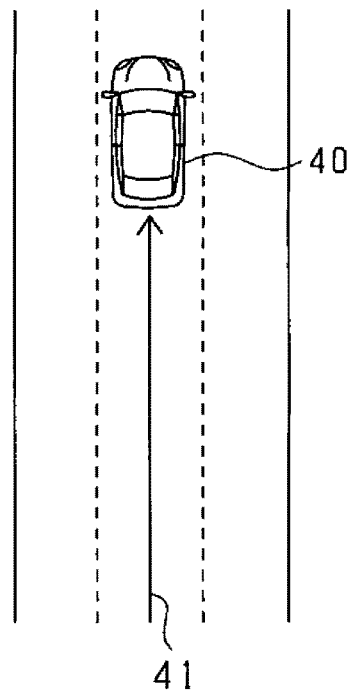
FIG. 12A is a view illustrating a method of determining whether the own vehicle is travelling straight according to a modification of each embodiment of the present invention.
Figure 12B:
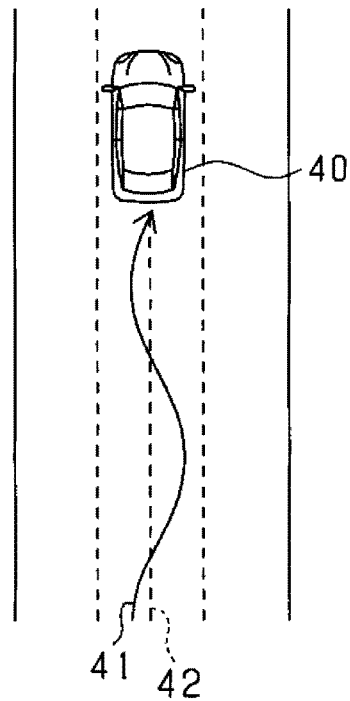
FIG. 12B is a view illustrating the method of determining whether the own vehicle is travelling straight according to the modification of each embodiment of the present invention.

FIG. 12A illustrates the history of values of the turning acceleration when the own vehicle 40 is travelling straight using reference numeral 41, and FIG. 12B illustrates the history of values of the turning acceleration when the own vehicle 40 is meandering using reference numeral 42.

Specifically, the operation state determiner 12 includes a meandering determiner 12*d* serving as a meandering determining means. The meandering determiner 12*d* stores the history of values of the turning acceleration measured by the yaw rate sensor 100 during a predetermined time period. As illustrated in FIG. 12A, the history 41 of the values of the turning acceleration measured by the yaw rate sensor 100 substantially shows a linear shape.

In contrast, as illustrated in FIG. 12B, the history 42 of the values of the turning acceleration measured by the yaw rate sensor 100 substantially shows a curved shape, i.e. a snaking shape.

Specifically, the meandering determiner 12*d* determines whether the variation width of the history of values of the turning acceleration measured by the yaw rate sensor 100 is larger than a predetermined range, and determines that the own vehicle 40 is meandering upon determination that variation width of the history of values of the turning acceleration measured by the yaw rate sensor 100 is larger than the predetermined range.

This enables the activation timing controller 13 to correct the first timing, i.e. the first threshold, in accordance with a result of the determination by the meandering determiner 12*d*.

It is possible to determine whether the own vehicle 40 is travelling straight in accordance with combination of the straight-travelling determination by the imaging device 22, the straight-travelling determination by the radar device 21, and the straight-travelling determination by the yaw rate sensor 100.

The cruise-assist ECU 10 according to each embodiment is configured to avoid a collision of the own vehicle 40 with an object existing in the forward travelling direction of the own vehicle 40 while the own vehicle 40 is travelling in the forward direction, but the present invention is not limited thereto. Specifically, the cruise-assist ECU 10 can be configured to detect an object existing in the travelling direction of the own vehicle 40 while the own vehicle 40 is travelling in the backward direction, and avoid a collision of the own vehicle 40 with the detected object. That is, the travelling direction of the own vehicle 40 means the forward direction of the own vehicle 40 when the own vehicle 40 is travelling forward, and also means the backward direction of the own vehicle 40 when the own vehicle 40 is travelling backward.

Each embodiment includes the warning device 31, the brake device 32, and the seatbelt device 33 as the safety devices, but the safety devices are not limited to these devices. Specifically, each embodiment can use various types of safety devices for avoiding collisions and/or mitigating collision damages.

This application is based on and claims the benefit of priority from Japanese Patent Application 2015-072919, the disclosure of which is incorporated in its entirety herein by reference.

REFERENCE SIGNS LIST

10 . . . Cruise-assist ECU

The invention claimed is:

1. A cruise-assist apparatus for activating, based on a probability of a collision between an own vehicle and a target object existing in a travelling direction of the own vehicle, a safety device for avoiding the collision or mitigating damage from the collision, the apparatus comprising:

a first determining means that determines whether a driver's collision avoidance operation in a longitudinal direction of the own vehicle has been carried out upon the target object existing in the travelling direction of the own vehicle;

a second determining means that determines whether a driver's collision avoidance operation in a lateral direction of the own vehicle has been carried out upon the target object existing in the travelling direction of the own vehicle;

a setting means that:

sets a first timing upon it being determined the determination that a the driver's collision avoidance operation in the longitudinal direction of the own vehicle has been carried out, the first timing being later than a reference timing for activating the safety device; and sets a second timing upon it being determined the determination that a the driver's collision avoidance operation in the lateral direction of the own vehicle has been carried out, the second timing being later than the reference timing; and an activation determining means that, upon the determination that the driver's collision avoidance operation in the lateral direction of the own vehicle has been carried out, determines whether to activate the safety device in accordance with the second timing independently of a result of the determination of whether the driver's collision avoidance operation in the longitudinal direction of the own vehicle has been carried out.

2. The cruise-assist apparatus according to claim 1, wherein:

the setting means is configured to, upon the determination that the driver's collision avoidance operation in the lateral direction of the own vehicle has been carried out, set the second timing to be later than the first timing, the first timing being set upon the determination that the driver's collision avoidance operation in the longitudinal direction of the own vehicle has been carried out.

3. The cruise-assist apparatus according to claim 1, further comprising:

a collision predicting means that calculates, based on a distance between the own vehicle and the target object and at least one of a relative speed and a relative acceleration between the own vehicle and the target object, a time to collision representing a margin time until which the own vehicle will collide with the target object, wherein the activation determining means is configured to determine whether to activate the safety device in accordance with comparison between the time to collision and a threshold corresponding to at least one of the first timing and the second timing.

4. The cruise-assist apparatus according to claim 1, wherein:

the collision avoidance operation in the longitudinal direction includes a driver's operation of an accelerator pedal of the own vehicle, and a driver's operation of a brake pedal of the own vehicle;

the setting means comprises:
  means that calculates a first correction in accordance with the driver's operation of the accelerator pedal; and
  means that calculates a second correction in accordance with the driver's operation of the brake pedal,
  the setting means being configured to, upon the driver's operation of the accelerator pedal and the driver's operation of the brake pedal being both carried out, set the first timing using one of the first correction and the second correction, one of the first correction and the second correction being larger than the other thereof.

5. The cruise-assist apparatus according to claim 1, further comprising:
  a road shape determining means that determines a shape of a road on which the own vehicle is travelling,
  wherein:
  the setting means is configured such that the first timing is set to be later if the shape of the road is determined by the road shape determining means to be a nonlinear shape than if the shape of the road is determined by the road shape determining means to be a linear shape.

6. The cruise-assist apparatus according to claim 1, further comprising:
  a region setting means that sets a region in the travelling direction of the own vehicle, the region having a predetermined width,
  wherein the activation determining means is configured to determine whether to activate the safety device for the target object located within the region,
  the region setting means being configured to reduce the width of the region upon a determination that the driver's collision avoidance operation in the lateral direction of the own vehicle has been started.

7. The cruise-assist apparatus according to claim 1, wherein:
  the target object is a preceding vehicle in the same direction as the travelling direction of the own vehicle ahead of the own vehicle, the cruse-assist apparatus further comprising:
  an overlap ratio obtaining means that obtains an overlap ratio representing a ratio of overlap between a width of the own vehicle and a width of the preceding vehicle in a lateral direction to the width of the own vehicle, the lateral direction being perpendicular to the travelling direction,
  the setting means being configured to set the first timing such that, the smaller the overlap ratio is, the later the first timing is.

8. The cruise-assist apparatus according to claim 1, further comprising:
  a meandering determining means that determines whether the own vehicle is meandering,
  wherein:
  the activation determining means is configured to determine whether to activate the safety device in accordance with the reference timing upon a determination that the own vehicle is meandering.

9. The cruise-assist apparatus according to claim 1, further comprising:
  a type identifying means that identifies a type of the target object, wherein:
  the setting means is configured to set the first timing and the second timing in accordance with the type.

10. The cruise-assist apparatus according to claim 1, wherein:
  the safety device comprises:
  a warning device having a first function of outputting a warning; and
  a brake device having a second function of assisting a driver's operation of a brake pedal of the own vehicle, and a third function of automatically braking the own vehicle; and
  the reference timing includes different values respectively set for the corresponding first, second, and third functions.

11. The cruise-assist apparatus according to claim 10, wherein:
  the setting means is configured to set at least one of the first timing and the second timing to different values respectively for the corresponding first, second, and third functions.

12. The cruise-assist apparatus according to claim 11, wherein:
  at least one of a difference between the first timing and the reference timing and a difference between the second timing and the reference timing is set to be largest for the first function as compared with at least one of the difference between the first timing and the reference timing and the difference between the second timing and the reference timing for each of the second and third functions.

13. A cruise-assist apparatus for activating, based on a probability of a collision between an own vehicle and a target object existing in a travelling direction of the own vehicle, a safety device for avoiding the collision or mitigate damage of the collision, the apparatus comprising:
  a first determining means that determines whether a driver's collision avoidance operation in a longitudinal direction of the own vehicle has been carried out upon the target object existing in the travelling direction of the own vehicle;
  a second determining means that determines whether a driver's collision avoidance operation in a lateral direction of the own vehicle has been carried out upon the target object existing in the travelling direction of the own vehicle;
  a setting means that:
  sets a first timing upon the determination that the driver's collision avoidance operation in the longitudinal direction of the own vehicle has been carried out, the first timing being later than a reference timing for activating the safety device; and
  sets a second timing upon the determination that the driver's collision avoidance operation in the lateral direction of the own vehicle has been carried out, the second timing being later than the reference timing; and
  an activation determining means that, upon a determination that both the driver's collision avoidance operation in the lateral direction of the own vehicle and the driver's collision avoidance operation in the longitudinal direction of the own vehicle have been carried out, determine whether to activate the safety device in accordance with one of the first timing and the second timing, one of the first timing and the second timing being later than the other thereof.

14. The cruise-assist apparatus according to claim 13, further comprising:
  a collision predicting means that calculates, based on a distance between the own vehicle and the target object and at least one of a relative speed and a relative acceleration between the own vehicle and the target object, a time to collision representing a margin time until which the own vehicle will collide with the target object, wherein the activation determining means is configured to determine whether to activate the safety device in accordance with comparison between the time to collision and a threshold corresponding to at least one of the first timing and the second timing.

15. The cruise-assist apparatus according to claim 13, wherein:

the collision avoidance operation in the longitudinal direction includes a driver's operation of an accelerator pedal of the own vehicle, and a driver's operation of a brake pedal of the own vehicle;

the setting means comprises:
means that calculates a first correction in accordance with the driver's operation of the accelerator pedal; and
means that calculates a second correction in accordance with the driver's operation of the brake pedal, the setting means being configured to, upon the driver's operation of the accelerator pedal and the driver's operation of the brake pedal being both carried out, set the first timing using one of the first correction and the second correction, one of the first correction and the second correction being larger than the other thereof.

16. The cruise-assist apparatus according to claim 13, further comprising:

a road shape determining means that determines a shape of a road on which the own vehicle is travelling, wherein:

the setting means is configured such that the first timing is set to be later if the shape of the road is determined by the road shape determining means to be a nonlinear shape than if the shape of the road is determined by the road shape determining means to be a linear shape.

17. The cruise-assist apparatus according to according to claim 13, further comprising:

a region setting means that sets a region in the travelling direction of the own vehicle, the region having a predetermined width, wherein the activation determining means is configured to determine whether to activate the safety device for the target object located within the region, the region setting means being configured to reduce the width of the region upon a determination that the driver's collision avoidance operation in the lateral direction of the own vehicle has been started.

18. The cruise-assist apparatus according to claim 13, wherein:

the target object is a preceding vehicle in the same direction as the travelling direction of the own vehicle ahead of the own vehicle, the cruse-assist apparatus further comprising:

an overlap ratio obtaining means that obtains an overlap ratio representing a ratio of overlap between a width of the own vehicle and a width of the preceding vehicle in a lateral direction to the width of the own vehicle, the lateral direction being perpendicular to the travelling direction, the setting means being configured to set the first timing such that, the smaller the overlap ratio is, the later the first timing is.

19. The cruise-assist apparatus according to claim 13, further comprising:

a meandering determining means that determines whether the own vehicle is meandering, wherein:

the activation determining means is configured to determine whether to activate the safety device in accordance with the reference timing upon a determination that the own vehicle is meandering.

20. The cruise-assist apparatus according to claim 13, further comprising:

a type identifying means that identifies a type of the target object, wherein:

the setting means is configured to set the first timing and the second timing in accordance with the type.

21. The cruise-assist apparatus according to claim 13, wherein:

the safety device comprises:
a warning device having a first function of outputting a warning; and
a brake device having a second function of assisting a driver's operation of a brake pedal of the own vehicle, and a third function of automatically braking the own vehicle; and the reference timing includes different values respectively set for the corresponding first, second, and third functions.

22. The cruise-assist apparatus according to claim 21, wherein:

the setting means is configured to set at least one of the first timing and the second timing to different values respectively for the corresponding first, second, and third functions.

23. The cruise-assist apparatus according to claim 22, wherein:

at least one of a difference between the first timing and the reference timing and a difference between the second timing and the reference timing is set to be largest for the first function as compared with at least one of the difference between the first timing and the reference timing and the difference between the second timing and the reference timing for each of the second and third functions.

24. A safety-device activation timing controlling method for controlling, based on a probability of a collision between an own vehicle and a target object existing in a travelling direction of the own vehicle, an activation timing for a safety device for avoiding the collision or mitigate damages of the collision, the method comprising:

a first determining step that determines whether a driver's collision avoidance operation in a longitudinal direction of the own vehicle has been carried out upon the target object existing in the travelling direction of the own vehicle;

a second determining step that determines whether a driver's collision avoidance operation in a lateral direction of the own vehicle has been carried out upon the target object existing in the travelling direction of the own vehicle;

a setting step that:
sets a first timing upon the determination that the driver's collision avoidance operation in the longitudinal direction of the own vehicle has been carried out, the first timing being later than a reference timing for activating the safety device; and sets a second timing upon the determination that the driver's collision avoidance operation in the lateral direction of the own vehicle has been carried out, the second timing being later than the reference timing; and an activation determining step that, upon the determination that the driver's collision avoidance operation in the lateral direction of the own vehicle has been carried out, determines whether to activate the safety device in accordance with the second timing independently of a result of the determination of whether the driver's collision avoidance operation in the longitudinal direction of the own vehicle has been carried out.

25. A safety-device activation timing controlling method for controlling, based on a probability of a collision between an own vehicle and a target object existing in a travelling direction of the own vehicle, an activation timing for a safety device for avoiding the collision or mitigating damage from the collision, the method comprising:

a first determining step that determines whether a driver's collision avoidance operation in a longitudinal direction of the own vehicle has been carried out upon the target object existing in the travelling direction of the own vehicle;

a second determining step that determines whether a driver's collision avoidance operation in a lateral direction of the own vehicle has been carried out upon the target object existing in the travelling direction of the own vehicle; a setting step that:

sets a first timing upon the determination that the driver's collision avoidance operation in the longitudinal direction of the own vehicle has been carried out, the first timing being later than a reference timing for activating the safety device; and sets a second timing upon the determination that the driver's collision avoidance operation in the lateral direction of the own vehicle has been carried out, the second timing being later than the reference timing; and an activation determining step that, upon it being determined a determination that both the driver's collision avoidance operation in the lateral direction of the own vehicle and the driver's collision avoidance operation in the longitudinal direction of the own vehicle have been carried out, determine whether to activate the safety device in accordance with one of the first timing and the second timing, one of the first timing and the second timing being later than the other thereof.

* * * * *